United States Patent [19]
Miller

[11] 3,789,284
[45] Jan. 29, 1974

[54] AIR MOVING MEANS DRIVE SYSTEM
[75] Inventor: Robert F. Miller, Bowling Green, Ohio
[73] Assignee: Modine Manufacturing Company, Racine, Wis.
[22] Filed: July 6, 1972
[21] Appl. No.: 269,500

[52] U.S. Cl. ............................. 318/377, 318/211
[51] Int. Cl. .............................................. H02p 3/24
[58] Field of Search ............... 318/63, 86, 209–212, 318/273, 275, 362, 375, 377, 378, 40, 57, 65, 87, 112, 363

[56] References Cited
UNITED STATES PATENTS
2,791,735   5/1957   Norman ............................. 318/211
3,678,353   7/1972   Marchi ............................. 318/211

*Primary Examiner*—Bernard A. Gilheany
*Assistant Examiner*—W. E. Duncanson, Jr.
*Attorney, Agent, or Firm*—Hofgren, Wegner, Allen, Stellman & McCord

[57] ABSTRACT

An air moving means drive system wherein a plurality of air moving means, such as motor driven fans, is operated to move air in a preselected direction during concurrent operation thereof. One of the air moving means is cycled on and off and is susceptible in the "Off" condition to reverse rotation by the movement of air by the operating air moving means. Braking means are provided for limiting the reverse speed of the non-operating air moving means. The air moving means may be driven by induction motors and the braking means may comprise dynamic braking means preventing reverse rotation of the nonoperating motor at a speed which would be sufficient to cause continued reverse movement upon an energization thereof which would normally be suitable to operate the motor in the preselected direction from standstill.

10 Claims, 2 Drawing Figures

2

AIR MOVING MEANS DRIVE SYSTEM

BACKGROUND OF THE INVENTION

1. Field of the Invention

This invention relates to drive systems and in particular to drive systems adapted for use in air moving apparatus.

2. Description of the Prior Art

In certain air moving systems, a plurality of air moving devices, such as fans, is provided for moving air in a normal direction of air flow. In one such system, at least one of the motor fans is cycled on and off and, thus, at times, is deenergized while one or more adjacent fans is being driven. Such operation, at times, has caused a reverse rotation of the deenergized motor by reverse movement of the air past the fan thereof. At times, the reverse speed becomes great enough so that when the de-energized motor is cycled "On", the starting torque thereof is insufficient to overcome the reverse speed and the motor is driven instead in the undesired reverse direction.

It is also known in the motor control art to provide means for braking motors. One common form of motor braking means comprises dynamic braking means. Illustratively, dynamic braking means are illustrated in U.S. Pat. No. 3,412,304 issued to M. C. Baum et al. for Motor Stopping and Reversing Circuits and No. 2,818,539 issued to R. E. Johnson for Control Apparatus for Alternating Current Motors.

SUMMARY OF THE INVENTION

The present invention comprehends an improved air moving means drive system wherein braking means are provided for limiting the speed of reverse movement of a de-energized air moving means. The braking means herein comprises dynamic braking means responsive to the reverse movement of the de-energized motor drive to provide a braking thereof sufficient to prevent the de-energized motor from attaining a reverse speed sufficient to cause that motor to operate in the reverse direction upon subsequent energization thereof in a manner normally causing forward rotation of the motor from standstill. Thus, the energization of the reversely driven motor is effective to stop the reverse rotation and cause desired driving rotation in the preselected forward direction. The invention is broadly applicable to any motor drive system wherein one of a plurality of motor drive units is caused to rotate in a reverse direction while de-energized, with the control serving to prevent the attainment of sufficient speed in the reverse direction to prevent proper forward operation of the motor upon energization thereof.

The apparatus of the present invention is extremely simple and economical of construction while yet providing the highly desirable features disclosed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
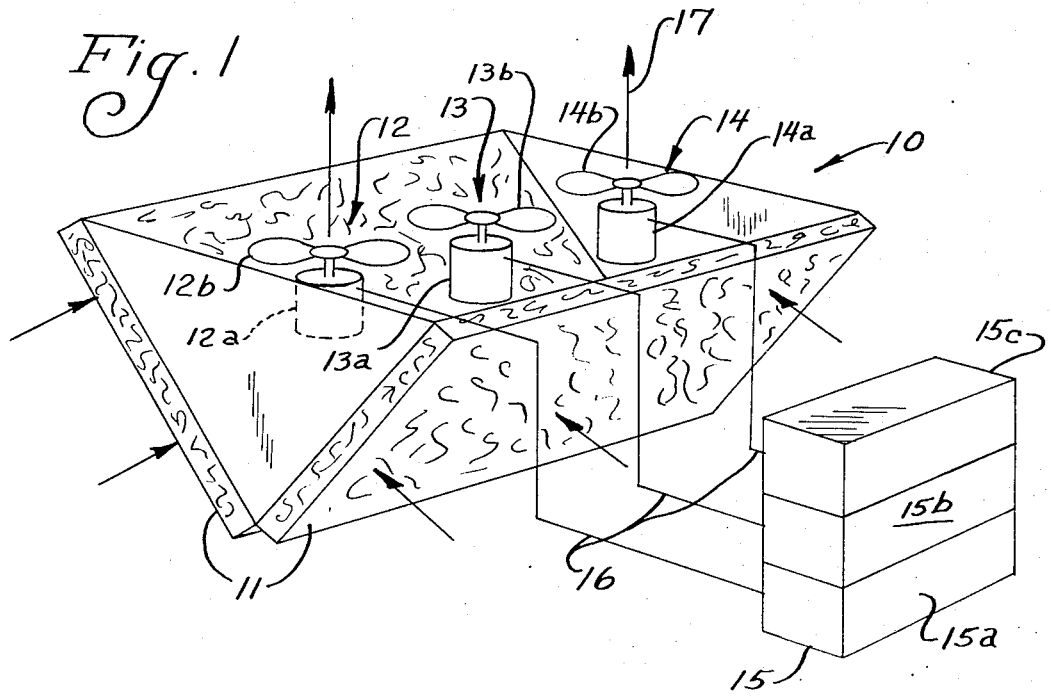
FIG. 1 is a perspective view of an air moving system having drive control means embodying the invention.

In the exemplary embodiment of the invention as shown in the drawing, an air moving means drive system generally designated 10 is shown to comprise a baffle 11 arranged to guide air to a plurality of air moving means 12, 13 and 14 comprising motors 12a, 13a and 14a, respectively, and fans 12b, 13b and 14b, respectively.

Operation of the motors is controlled by a suitable electric control 15 and interconnecting wires 16.

In the illustrated embodiment, as shown in FIG. 1, the air to be circulated is driven by the fans in a preselected upward direction as shown by the arrows 17.

Control 15 includes conventional motor control apparatus 15a for controlling the operation of motor 12a, and 15c for controlling the operation of motor 14a.

Figure 2:
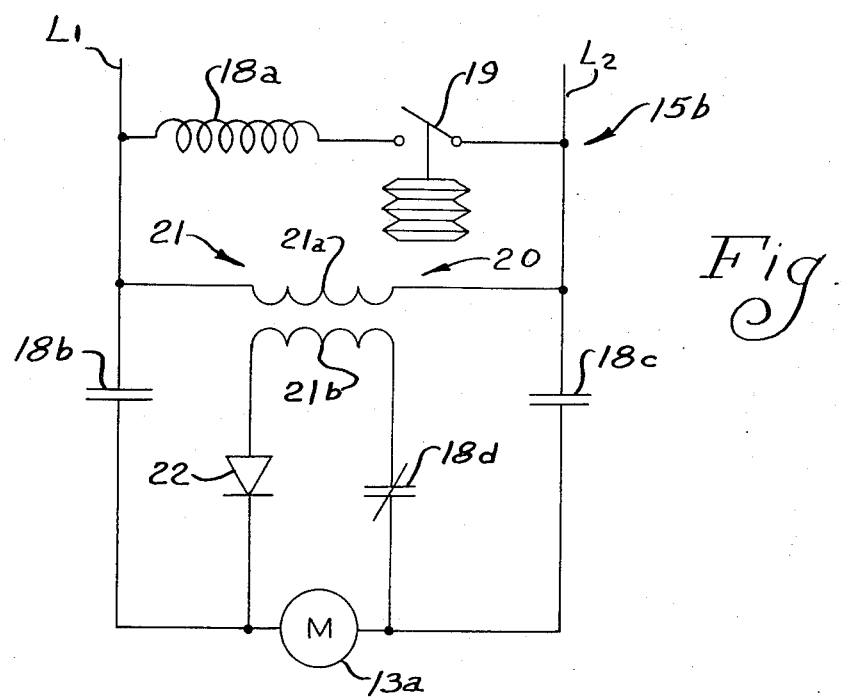
FIG. 2 is a schematic wiring diagram illustrating a control means embodying the invention for preventing undesirable high speed reverse rotation of a cyclically operated drive motor thereof.

Control of motor 13a is effected by a control 15b schematically illustrated in FIG. 2 to include a motor starter solenoid 18a connected in series with a pressure operated switch 19 across power supply leads L1 and L2. The pressure swtich 19 may be responsive, for example, to the head pressure of a refrigeration system for cycling the motor 13a on and off while motors 13a and 14a continue to be operated to deliver air in the preselected upward direction by the fans 12b and 14b. Motor 13a is connected to the power supply leads through a pair of normally open contacts 18b and 18c controlled by the coil 18a so that when switch 19 is closed to energize coil 18a, the motor is connected across power supply leads L1 and L2 by the resulting closing of contacts 18b and 18c. When switch 19 opens, the motor is de-energized by the opening of contacts 18b and 18c as a result of the de-energization of contactor coil 18a.

As indicated above, when motor 13a is de-energized, motors 12a and 14a may continue to drive fans 12b and 14b, respectively, to deliver air in the preselected upward direction. Such operation of fans 12b and 14b, however, tends to draw air downwardly past fan 13b as a result of the suction pressure induced below fans 12b and 14b. Thus, fan 13b may be rotated in a reverse direction relative to its normal direction of rotation when fan motor 13a is energized, and in turn, causes motor 13a to be rotated in a reverse direction.

Where the speed of reverse rotation of motor 13a is relatively low, the normal starting torque of motor 13a developed when contacts 18b and 18c are subsequently closed by a reclosing of pressure switch 19 will be sufficient to stop the reverse rotation and permit forward driving rotation of the motor 13a. However, it has been found that, at times, the reverse rotational speed of de-energized motor 13a by the reverse air flow is sufficient to prevent such reversal of rotational direction by the energization of motor 13a and the connection of motor 13a across the power supply causes instead a continued driving rotation of motor 13a in the reverse direction. To prevent such undesirable reverse driving of motor 13a and fan 13b, the present invention comprehends providing a braking of motor 13a sufficient to prevent a reverse speed of motor 13a great enough to prevent proper foward operation of the motor when subsequently energized. More specifically, the invention comprehends providing dynamic braking means generally designated 20 for preventing motors 13a from attaining such an undesirable high reverse speed. Thus, as shown in FIG. 2, the dynamic braking means may include a potential transformer generally designated 21 having a primary winding 21a connected across power supply leads L1 and L2. The secondary winding 21b of transformer 21 is connected in series with a normally closed contact 18d controlled by contactor coil 18a, and a rectifier 22, the series connection of the contacts 18d, secondary winding 21b, and rectifier 22 beong connected in parallel with the motor 13a providing a direct current therein whenever contactor coil 18a and thusly motor 13a are de-energized.

The direct current developed in motor 13a functions to provide a dynamic braking as a result of the rotational movement of the motor such as discussed above in the reverse direction by the reverse movement of air against fan 13b. The amount of dynamic braking thusly provided is preselected to assure the prevention of motor 13a from attaining a reverse speed sufficient to cause motor 13a to operate in the reverse direction when contacts 18b and 18c are subsequently closed to reconnect the motor to the power supply. Thus, such re-energization of motor 13a from the power supply immediately stops the reverse rotation of the motor and causes forward operation of the motor 13a to drive the fan 13b in the desired forward direction to deliver air upwardly in the direction of arrow 17 together with the air being delivered by fans 12b and 14b.

The provision of normally closed contacts 18d provides for disconnection of the direct current means from the motor 13a during the normal forward driving operation thereof to provide the dynamic braking function only when motor 13a is de-energized.

Thus, the invention broadly comprehends the provision of control means for preventing driving of a motor in an undesired reverse direction because of a high speed reverse rotation of the motor while de-energized.

The foregoing disclosure of specific embodiments is illustrative of the broad inventive concepts comprehended by the invention.

I claim:

1. An electric motor drive system comprising: a plurality of alternating current induction motors arranged to drive in a preselected direction and wherein a condition may arise wherein one of said motors while being de-energized is urged to rotate reversely to said preselected direction at a speed which would be sufficient to cause that motor to operate in the reverse direction upon an energization thereof suitable to operate the motor in said preselected direction from standstill; and control means for preventing such reverse operation including means responsive to reverse rotation of said de-energized motor for providing a braking thereof sufficient to prevent said de-energized motor from attaining said reverse speed whereby upon energization thereof the reverse rotation is stopped and driving rotation in the preselected direction is effected.

2. The electric motor drive system of claim 1 wherein said control means comprises dynamic braking means utilizing rotational energy of said reversely rotating motor to provide said braking thereof.

3. The electric motor drive system of claim 1 wherein said control means comprises means for applying a direct current to the de-energized motor for dynamically braking the motor.

4. The electric motor drive system of claim 1 wherein means are provided for cyclically energizing and de-energizing said one motor and actuating said control means upon de-energization of said one motor.

5. The electric motor drive system of claim 1 wherein said control means comprises dynamic braking means utilizing rotational energy of said reversely rotating motor to provide said braking thereof including a potential transformer and rectifier means connected to said one motor for operating a direct current through the de-energized reversely rotating motor.

6. Apparatus comprising:
a first air moving means;
second air moving means arranged to move air in a preselected direction and being susceptible to movement of air by said first air moving means to be driven thereby in a reverse direction when said first air moving means is being operated and said second air moving means is not being operated; and
means responsive to reverse driving of said second air moving means by said air movement to brake said second air moving means and maintain the reversely driven speed thereof below a preselected maximum.

7. The apparatus of claim 6 wherein said second air moving means is disposed laterally adjacent said first air moving means.

8. The apparatus of claim 6 wherein said air moving means are arranged to move air in the same direction during concurrent operation thereof.

9. The apparatus of claim 6 wherein a third air moving means is provided adjacent said second air moving means and said second air moving means is susceptible also to movement of air by said third air moving means to be driven thereby in a reverse direction when said third air moving means is being operated and said second air moving means is not being operated.

10. The apparatus of claim 9 wherein said first, second and third air moving means are arranged to move air in the same direction during concurrent operation thereof.

* * * * *